J. A. KISTER.
Middlings Purifier.
No. 238,921.　　　　　　　　　Patented March 15, 1881.
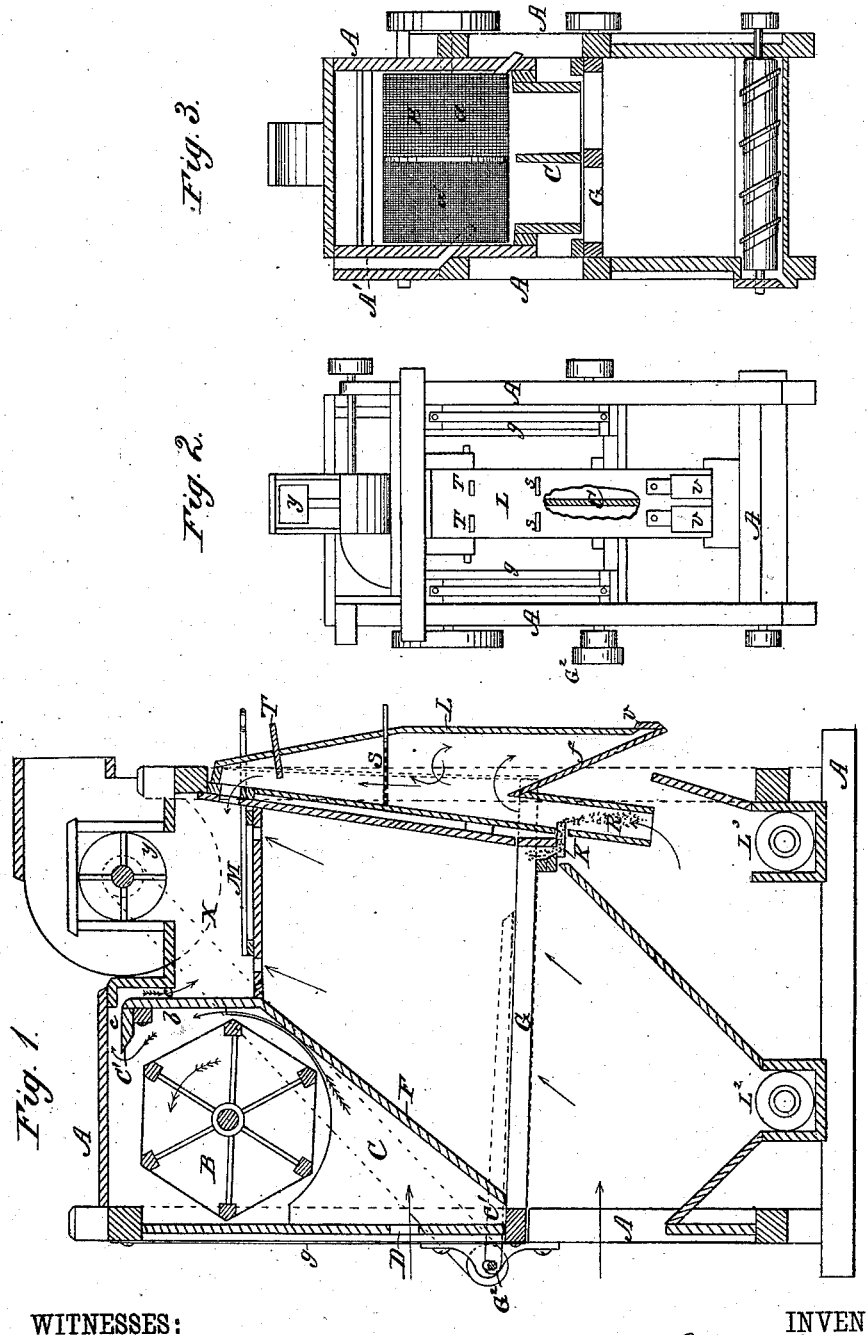

United States Patent Office.

JOHN A. KISTER, OF MILL BROOK, OHIO.

MIDDLINGS-PURIFIER.

SPECIFICATION forming part of Letters Patent No. 238,921, dated March 15, 1881.

Application filed December 8, 1879.

*To all whom it may concern:*

Be it known that I, JOHN A. KISTER, of Mill Brook, in the county of Wayne and State of Ohio, have invented a new and Improved Middlings - Purifier and Tailings - Separator; and I do hereby declare that the following is a full, clear, and exact description of the same.

My invention relates to the combination and arrangement of parts whereby the bran and coarser particles are separated from the middlings.

In accompanying drawings, Figure 1 is a vertical longitudinal section of the machine. Fig. 2 is an end view, part being broken out; and Fig. 3 is a vertical cross-section.

The machine has a frame, A, which furnishes support for the operative mechanism.

The middlings to be purified and graded enter the reel B through spout A', Fig. 3. Said reel is covered in zones or sections with bolting-cloth of different degrees of fineness, the number of sections $a$ $a'$ being as many as the grades of middlings it is desired to obtain.

The lower portion of the reel-chamber is divided, by transverse partitions C, into a series of pockets, corresponding in number and position with the divisions of the reel B into graded sections.

The reel is separated from the fan-chamber $x$ by a vertical partition, $b$; but they communicate by the passage $c$, through which the fan $y$ draws air into its chamber $x$. The air-current enters through apertures D in the front side of the machine, passes beneath the reel B and around the rear side of the same, and over the ledge or deflector C' into the passage $c$. The middlings, carried along by it, are thrown against the deflector C' and intercepted, so that they fall out of the current, while the light fibrous particles (dust, &c.) pass over the deflector C' and enter air-chamber $x$. The middlings thus deflected and separated from the lighter particles are carried around the reel B in the weaker air-current created by the revolution of the latter, and are mingled with the main body of middlings, that pass through the reel B, fall upon the inclined bottom F of the reel-chamber, and slide down to the openings, through which they pass onto the horizontally-reciprocating shaker G. The latter is covered with bolting-cloth and suspended free by straps $g$, and reciprocated by eccentric or crank shaft $G^2$. The fan $y$ draws air up through shaker G and apertures in the top of the same, the force of the current being controlled by valve M, whose adjustment governs the available size of said apertures. All the material that does not pass through the shaker G escapes as tailings into a spout, K, which is attached to the shaker, but projects into the spout R of chest L, wherein the tailings are separated, as hereinafter described. The fan $y$ draws air up through the tailings-separator L, as well as from the reel and shaker chambers. The inner wall of the chamber L is inclined outward from the top downward, so that the action of the air-current on the tailings may be facilitated by being deflected from the perpendicular over the pocket $f$. A diaphragm, S, having a number of perforations, divides the chamber L transversely about its lengthwise middle, and a valve, T, is also provided in the upper part of the chamber. The perforated diaphragm breaks up the air-current and causes eddies in the same, which facilitate the separation of the finer from coarser or bran-like portion of the tailings, so that the latter fall into the pockets $f$, from which they may be removed through valved openings. By means of this separator L, I avoid the necessity of providing the shaker G with more than one number of bolting-cloth for each section, and of constructing it of as great length as usual heretofore, and thus secure greater economy and compactness in the construction of the machine. I also obtain a more important advantage in the more perfect separation of the tailings. Middlings carried along from shaker G into the spout R are mainly separated from the bran, &c., and fall into the trough of conveyer $L^2$.

What I claim as new is—

The combination, with the shaker and bolting-reel and the fan $y$, of the tailings-separator L, having the inner wall inclined so that its upper part overhangs the pocket $f$, and the perforated diaphragm S, all constructed and arranged as shown and described, for the purpose specified.

JOHN A. KISTER.

Witnesses:
GEO. C. KISTER,
ELMER G. OLDROZD.